United States Patent
Stymne et al.

(10) Patent No.: US 10,140,332 B2
(45) Date of Patent: Nov. 27, 2018

(54) METHOD AND SYSTEM FOR DATA CACHE HANDLING

(71) Applicant: KING.COM LIMITED, St. Julians (MT)

(72) Inventors: Patrik Stymne, Stockholm (SE); Lars Sjodin, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 14/244,313

(22) Filed: Apr. 3, 2014

(65) Prior Publication Data

US 2014/0304288 A1    Oct. 9, 2014

(30) Foreign Application Priority Data

Apr. 3, 2013 (GB) .................................. 1306035.5

(51) Int. Cl.
  *G06F 17/30* (2006.01)
  *G06F 12/0866* (2016.01)
  *G06F 12/0897* (2016.01)
  *H04L 29/08* (2006.01)

(52) U.S. Cl.
  CPC .... *G06F 17/30386* (2013.01); *G06F 12/0866* (2013.01); *G06F 12/0897* (2013.01); *G06F 17/3048* (2013.01); *G06F 17/30312* (2013.01); *H04L 67/2842* (2013.01)

(58) Field of Classification Search
  USPC .................................................. 707/705–788
  See application file for complete search history.

(56) References Cited

U.S. PATENT DOCUMENTS

| 6,122,650 A * | 9/2000 | Takeyama ............... G06F 17/21 707/999.001 |
| 6,199,107 B1 | 3/2001 | Dujari |
| 7,565,423 B1 | 7/2009 | Fredricksen |
| 8,171,114 B1 * | 5/2012 | Dale ................... H04L 67/2842 709/217 |
| 2004/0128346 A1 | 7/2004 | Melamed et al. |
| 2008/0034003 A1 * | 2/2008 | Stakutis ............ G06F 17/30085 |
| 2008/0039189 A1 * | 2/2008 | Walker ................... G06Q 30/06 463/25 |
| 2010/0077478 A1 * | 3/2010 | Hull .................. G06F 17/30011 726/22 |

(Continued)

FOREIGN PATENT DOCUMENTS

| WO | 01/98920 A1 | 12/2001 |
| WO | 2012/091693 A1 | 7/2012 |

OTHER PUBLICATIONS

International Search Report, dated Jul. 28, 2014, and Written Opinion, issued in corresponding International Application No. PCT/EP2014/056755.

(Continued)

*Primary Examiner* — Tuan-Khanh Phan

(74) *Attorney, Agent, or Firm* — Saul Ewing Arnstein & Lehr LLP

(57) ABSTRACT

A method for caching in a server is provided. Data from a database is duplicated in an external cache and a hot cache which are used to speed up access and distribute server load reducing access traffic the database. The server is configured to process data requests by checking the hot cache first, then the external cache before attempting to retrieve data from the database.

18 Claims, 7 Drawing Sheets

(56) References Cited

U.S. PATENT DOCUMENTS

2011/0086693 A1* 4/2011 Guziel .................... G07F 17/32
                                                                463/17
2012/0173510 A1* 7/2012 Risvik ............... G06F 17/30628
                                                               707/711

OTHER PUBLICATIONS

Communication pursuant to Article 94(3) EPC, dated May 16, 2017, issued in related EP Application No. 14717116.9.

* cited by examiner

METHOD AND SYSTEM FOR DATA CACHE HANDLING

CROSS-REFERENCE TO RELATED APPLICATIONS

This application is based on, and claims priority to, Great Britain Application No. GB 1306035.5, filed Apr. 3, 2013, the entire contents of which is fully incorporated herein by reference.

FIELD OF THE INVENTION

Some embodiments relate to a method and system for data cache handling in a server. The server may be used to handle data requests for the purposes of providing information to to computer gaming software running on a client device.

BACKGROUND OF THE INVENTION

In computer gaming, it is commonplace to communicate over a network to provide additional functionality. This functionality may comprise synchronisation between a plurality of devices. This synchronisation may be for the purposes of multiplayer gaming. Alternatively the synchronisation may be between two client devices of the same user allowing a user to share game progress between two or more devices. The synchronisation may be directly between the plurality of devices or alternatively it may be via a server. It may be the case that such a server comprises a database for storing data related to the client devices. For computer games with a large number or users and/or a large amount of traffic per user, there may be a high volume of data requests to the database of the server. High traffic to a database can cause delays and affect stability of the database. Accordingly it may be desirable to reduce the number of accesses to the database.

SUMMARY OF THE INVENTION

According to a first aspect there is provided a method comprising receiving a request for one or more records; retrieving any of said one or more records from a first data store storing a first subset of data if said one or more records is in said first subset of data; retrieving any of said one or more records from a second data store storing a second subset of data if said one or more records is in said second subset of data and has not been retrieved from said first data store; and retrieving any of said one of more records from a third data store storing said data if said one or more records are not in said first and second subsets of data.

The first subset may be a subset of said second subset.

At least one of the first, second and third data stores may comprise a plurality of data stores.

The method may further comprise determining, from said request, in which of said plurality of data stores said one or more records is stored.

The method may further comprise storing the one or more records in the first data store and the second store if the one or more records are not already stored in the first data store and the second data store respectively.

Said retrieving from said first data store may be performed before said retrieving from said second data store and wherein said retrieving from said second data store is performed before said retrieving from said third data store.

The first data store may store said first subset of data for a first time period.

The second data store may store said second subset of data for a second time period.

The second time period may be greater than the first time period.

According to a second aspect there is provided a server in communication with a first data store; a second data store; and a third data store; wherein said apparatus is configured to: receive a request for one or more records; retrieve any of said one or more records from a first data store storing a first subset of data if said one or more records is in said first subset of data; retrieve any of said one or more records from a second data store storing a second subset of data if said one or more records is in said second subset of data and has not been retrieved from said first data store; and retrieve any of said one of more records from a third data store storing said data if said one or more records are not in said first and second subsets of data.

The first subset may be a subset of said second subset.

At least one of the first, second and third data stores may comprise a plurality of data stores.

The server may be configured to determine from said request, in which of said plurality of data stores said one or more records is stored.

The server may be configured to store the one or more records in the first data store and the second store if the one or more records are not already stored in the first data store and the second data store respectively.

The server may be configured to retrieve data from said first data store before said retrieving data from said second data store and wherein said retrieving from said second data store is performed before said retrieving from said third data store.

The first data store may be configured to store said first subset of data for a first time period.

The second data store may be configured to store said second subset of data for a second time period.

The second time period may be greater than said first time period.

BRIEF DESCRIPTION OF DRAWINGS

To understand some embodiments, reference will now be made by way of example only to the accompanying drawings, in which.

DETAILED DESCRIPTION OF SOME EMBODIMENTS

Some embodiments may reduce traffic to the server in a system by using different data bases or data stores that temporarily store some of the data for multiple retrieval. This system and method can be referred to as 'double caching'.

Figure 1:
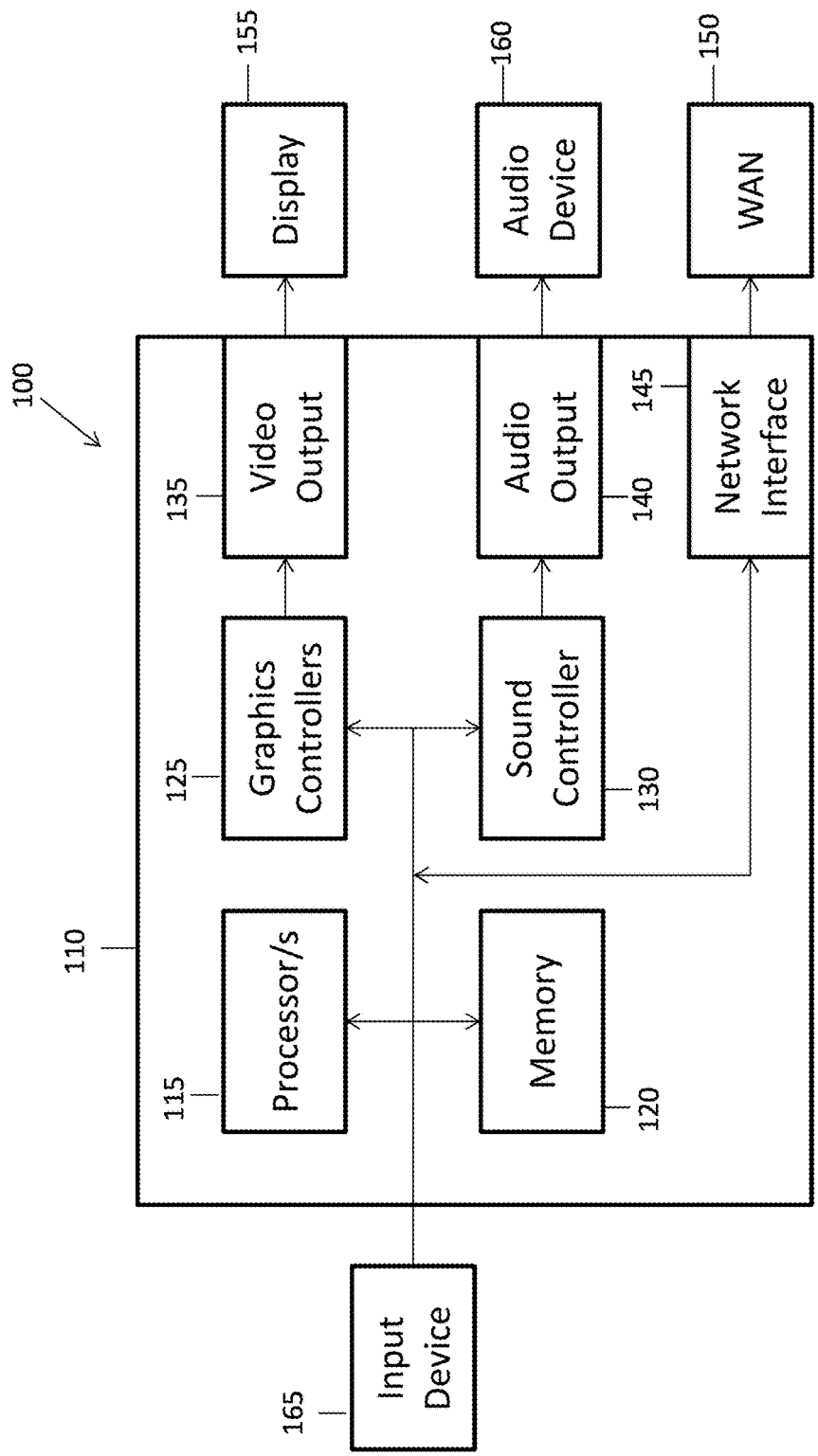
FIG. 1 shows an example computing device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
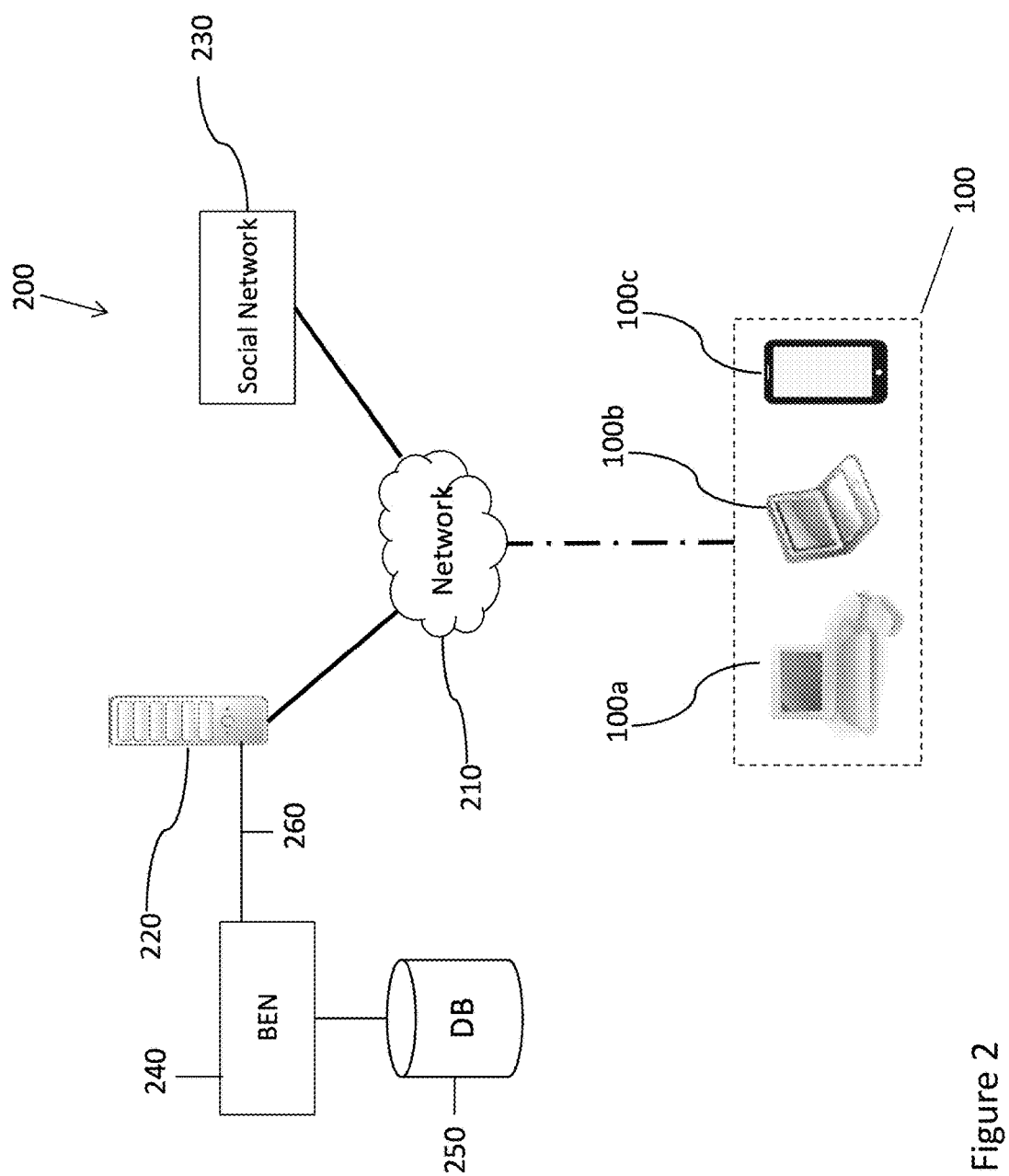
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or in data bases across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230.

Figure 3:
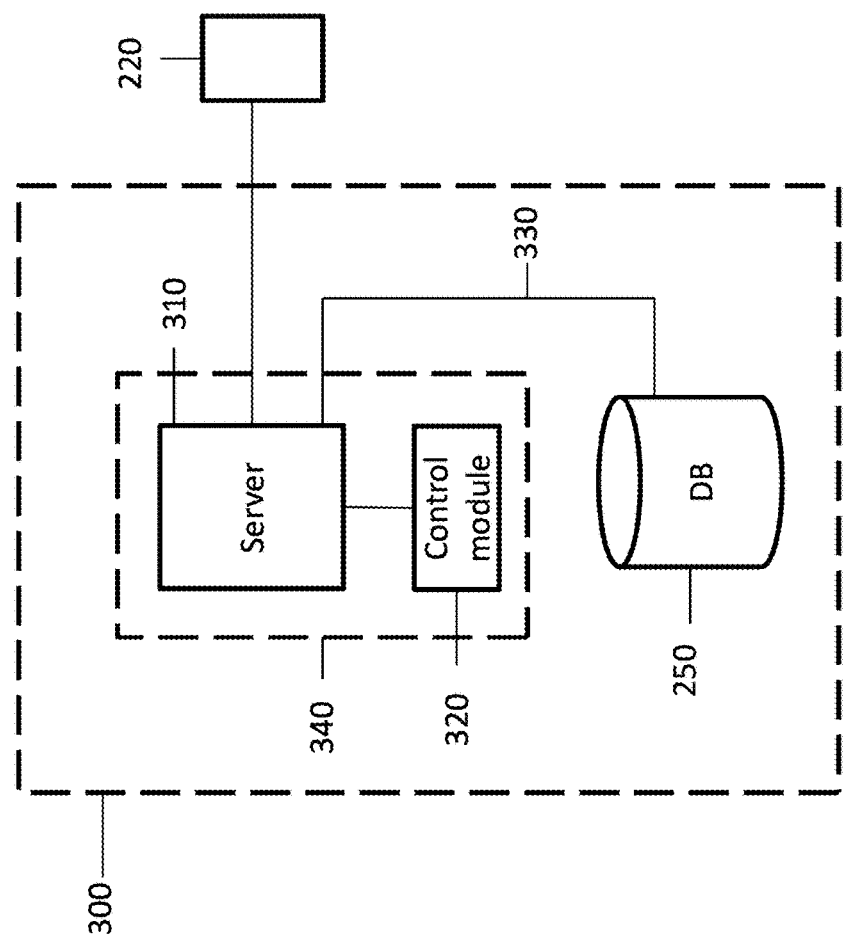
FIG. 3 shows a back-end system according to some embodiments.

FIG. 3 illustrates a back end infrastructure 300 according to an embodiment, comprising a server 310 in communication with or connected to a control module 320. The control module 320 may be implemented 340 as part of server 310, or may be a separate module 320 external to and connected with the server 310. The server 310 may be one of many servers, such as those known to the person skilled in the art as a server farm 340, or rack.

The server 310 or server farm 340 may be connected as shown to server 220, and to database 250 via link 330. Link 330 may be wired, wireless and/or provided via or through networks such as the internet, as known to those persons skilled in the art. The control module 320 provides control and update of data in the database(s) 250.

Figure 4:
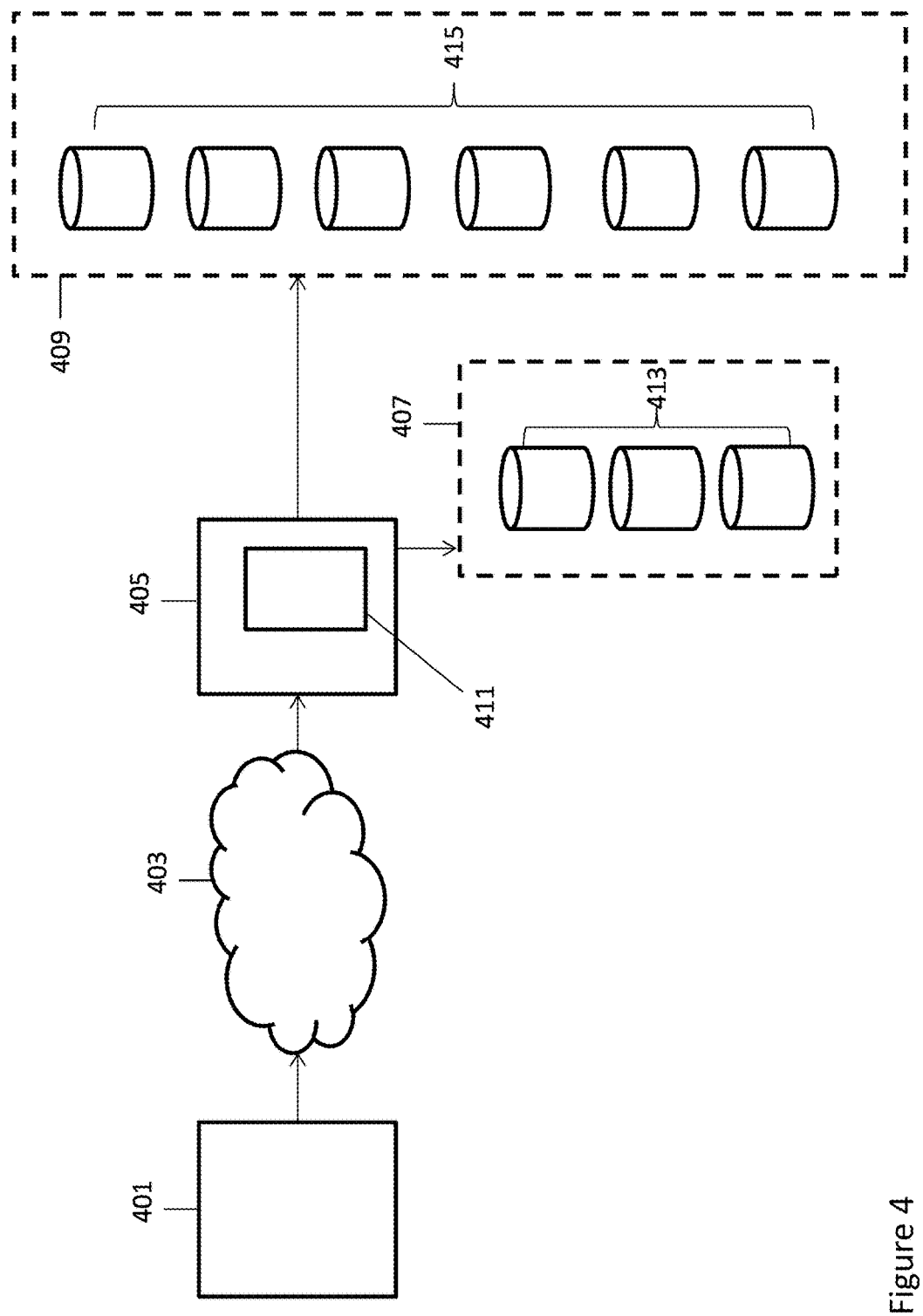
FIG. 4 shows an example system of an embodiment.

Reference is now made to FIG. 4 which shows a system according to one embodiment. A user device 401 is connected to a server 405 over network 403. Network 403 may be the internet or the like. Server 405 comprises a so called hot cache 411. Server 405 is further connected to an external cache 407 and database layer 409. External cache 407 comprises a plurality of servers 413. Database layer 409 comprises a plurality of servers 415. Hot cache 411 and external cache 407 are configured to store some of the data stored in the database layer 409 to reduce the number of data requests that are handled by the database layer.

A client device may request a single record from the database by sending a 'get' request for a single key, a unique identifier for specific data. Alternatively a user may request a plurality of data records. Accordingly a 'get' request may be sent for a plurality of keys. The plurality of keys may be a list of keys and/or a range of keys, for example 1 to 100. A server may receive a get method for an array of keys. The sever is configured to first look in the hot cache for the keys, then look in the external cache for any keys that weren't found in the hot cache. Finally the server is configured to retrieve any keys not found in the hot cache or external caches. In this way the number of requests that are processed by the database are reduced. After the data is retrieved, the hot cache and the external cache are updated to ensure that all the requested data records are stored. Accordingly a request for the same data in a short space of time may be retrieved quicker since the data may be found entirely in the hot cache. Similarly, after a longer period of time, the data may be found in external cache but not the hot cache. This allows data retrieval to be sped up whilst reducing the traffic to the database.

Figure 5:
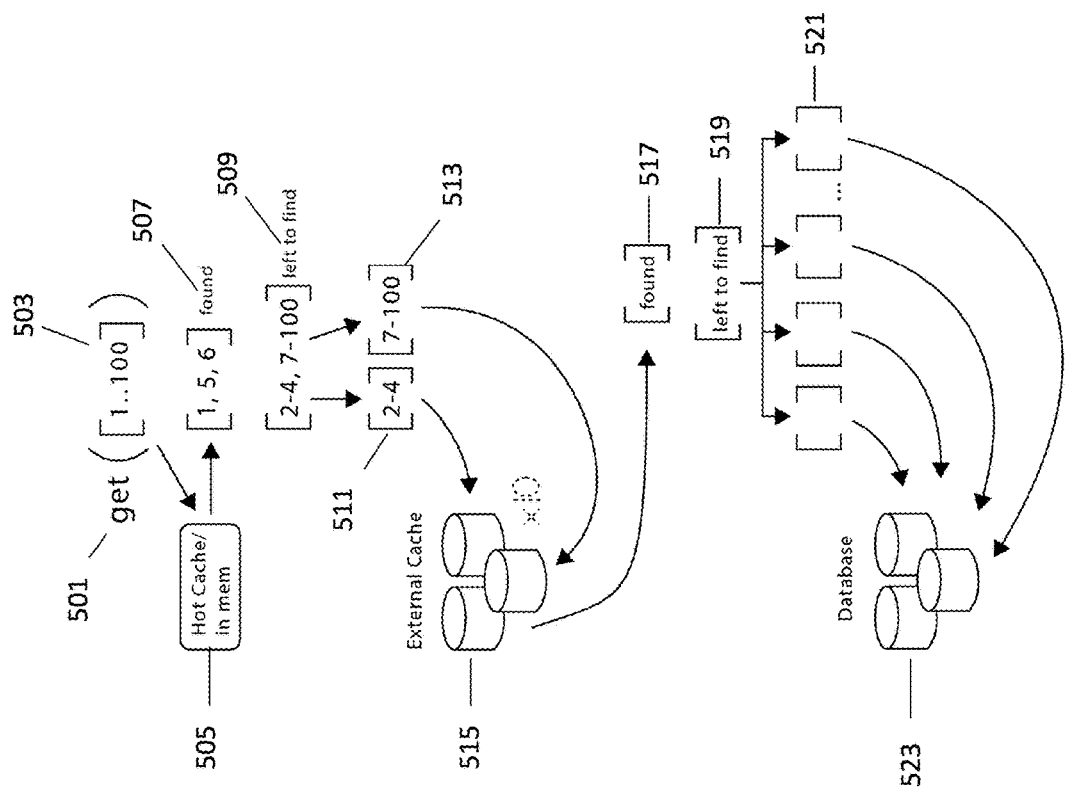
FIG. 5 shows an example get method of an embodiment.

Reference is now made to FIG. 5 which shows a get method invoking double caching of one embodiment. Get method 501 requests one or more keys 503, for example all keys in the range 1 to 100. This request is received by the server which determines which of the one or more keys 503 are stored in a hot cache 505. Hot cache 505 is a high speed memory location and may be in the internal memory of the server. Hot cache 505 is configured to store recently accessed keys. There may be a time limit per key wherein a key is stored in hot cache 505 for a set time and is removed at the end of the time period. Alternatively the hot cache may be configured to store a fixed number of the most recently requested keys. By keeping the most recently requested keys in the hot cache, the retrieval time for the stored keys can be greatly reduced. A subset of the one or more keys 507 (keys 1, 5 and 6 in the example of FIG. 5) are found in the hot cache and are able to be retrieved by the server. The remaining keys which were not found in the hot cache 509 (keys 2 to 4 and 7 to 100 in the example of FIG. 5) are then searched for in an external cache 515. External cache 515 may be distributed across one or more servers in order to reduce the individual server load. The external distributed cache 515 allows the storage of a much greater quantity of data than hot cache 505 but may have a higher key retrieval time. External cache 515 is configured to store recently accessed keys. The number of keys stored this way is significantly larger than the number of keys stored in hot cache 505. External cache 515 may be configured to store recently accessed keys for a set time. Alternatively, a set number of recently accessed keys may be stored. The server handling get request 501 is configured to search for remaining keys 509 in the external cache 515. The keys stored in external cache 515 are distributed across the external cache servers in a known way such that the get method is able to determine which server the data may be stored on from the key. The data may be stored according to a value of a hash of the key. Accordingly, it is not possible to determine whether a key is stored in the external cache but it is possible to determine which of the servers of external cache 515 each key would be stored on. Accordingly, remaining keys 509 are divided into one or more subsets of keys 511, 513 corresponding to the servers of external cache 515 that may contain the respective subsets of keys. These subsets are then passed to the respective servers of external cache 515. A subset of the keys 517 may be able to be retrieved leaving another subset 519 still left to be retrieved. Since these keys have not been found in hot cache 505 or external cache 515 they must be retrieved from database 523. Similar to the external cache, the database is distributed across multiple servers with the keys stored in intervals. The server knows which database server stores each key. Accordingly the remaining keys 519 are split into subsets 521 which are passed to the corresponding servers of database 523.

The time periods of the hot cache and the external cache may be provided to optimise performance. The time period of the external cache may be greater than the time period of the hot cache. The time period may be dependent on any number of parameters. For example, the time period may be determined by the typical play length of a game or the expected frequency of user interaction. For example, a game may last, on average, for two minutes and may only be playable once every 24 hours. In this situation the hot cache time period may be five minutes and the external cache time period may be 48 hours. Alternatively, a game may typically played for 30 minutes and may typically be played every two to three hours. In this case, the hot cache time period may be one hour and the external cache time period may be four hours.

Figure 6:
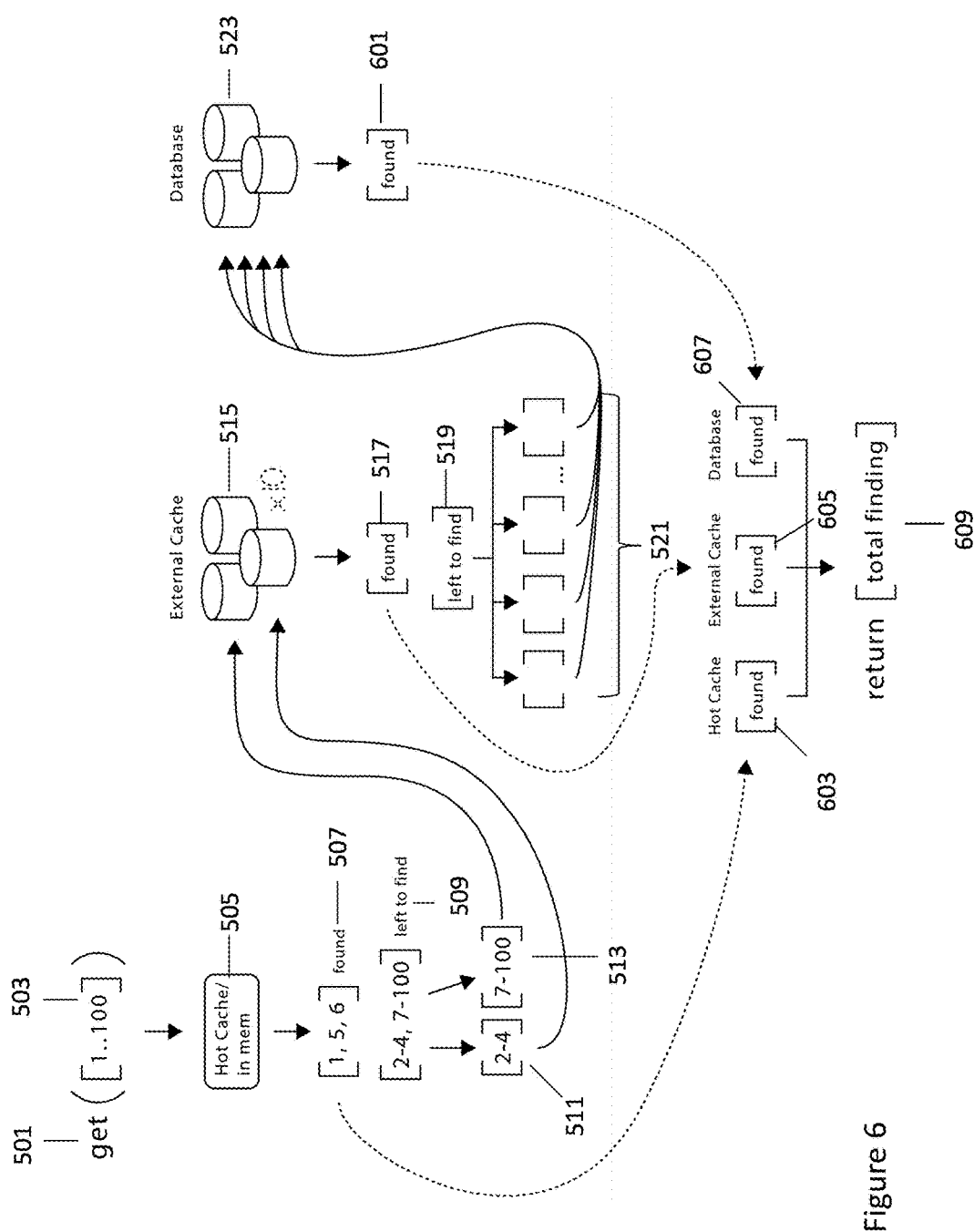
FIG. 6 shows an example get method of an embodiment.

Reference is now made to FIG. 6 which shows the features of FIG. 5 with the addition of the return values of the function. The subsets 521 are found in database 523 and are stored in subset 601. Subsets 507, 517 and 601 are then retrieved from hot cache 505, external cache 515 and database 523 respectively. The data is stored in output components 603, 605 and 607. Output components 603, 605 and 607 are combined into a single output 609 which is returned by the get method.

After data is retrieved, external cache 215 may be updated to store data 307 which was not previously stored there. Similarly, hot cache 205 may be updated to store data 305 and 307 which was not previously stored there. Accordingly, the full range of requested keys 203 may then be present in both the hot cache 205 and the external cache 215. This may allow faster retrieval of the same data keys in future get requests.

Figure 7:
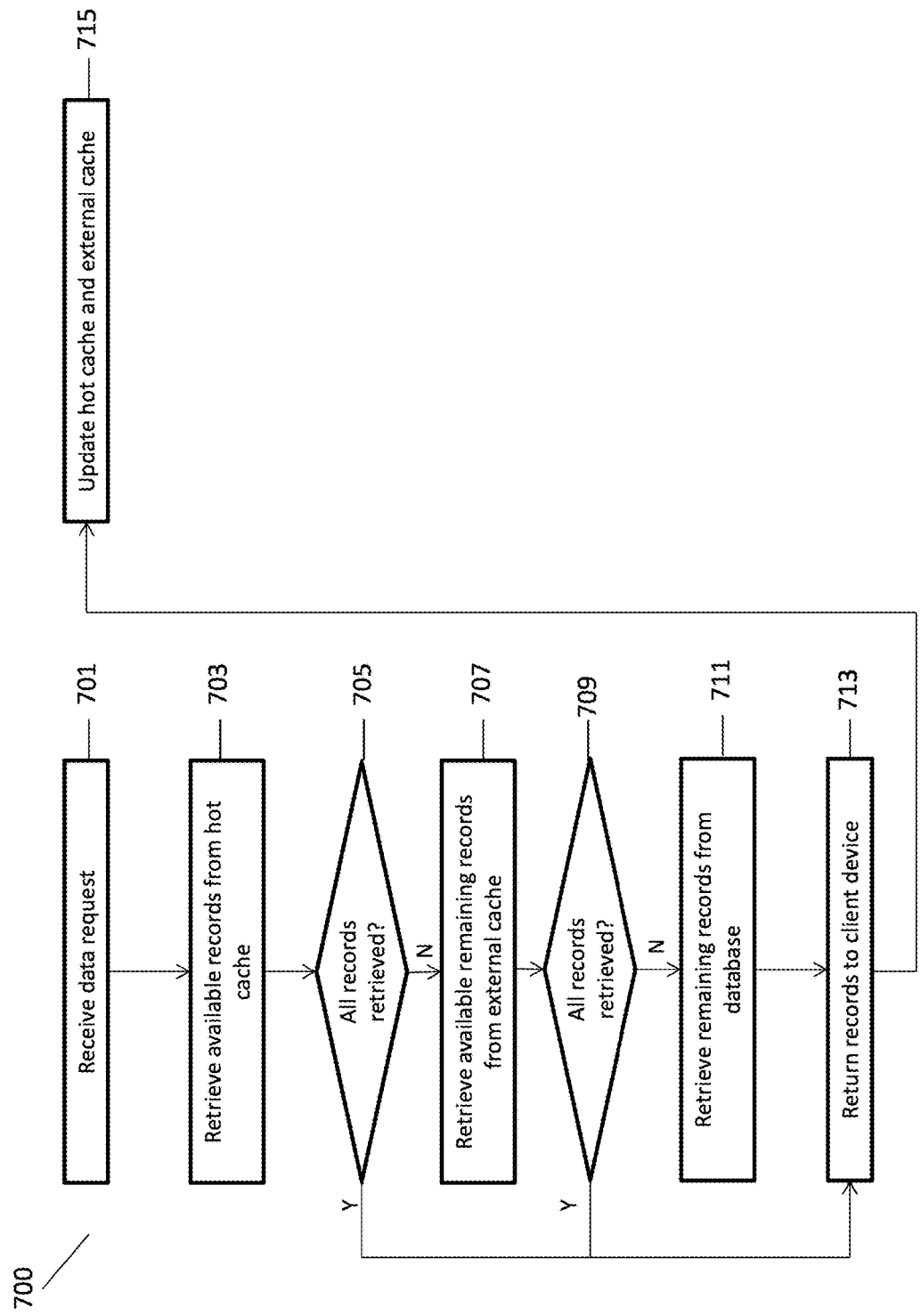
FIG. 7 shows a method according to one embodiment.

Reference is now made to FIG. 7 which shows a method according to an embodiment. At step 701, a request for data is received at the server from a client device. At step 703 the server determines which records are available from the hot cache 505. The server then determines if all requested records have been retrieved at step 705. If all requested records have been retrieved then the server returns the retrieved records to the client device at step 713. If not, the server looks for the remaining records in external cache 515. The server then determines if all requested records have been retrieved at step 709. If all requested records have been retrieved then the server returns the retrieved records to the client device at step 713. If not, the server retrieves the remaining records from database 523 at step 713.

The records may be retrieved immediately after they are located in the hot cache, external cache and database. Alternatively, the records may be located individually and retrieved together after all records have been located.

Optionally in step 715, after the records have been retrieved and returned to the client device, the server updates the hot cache 505 and the external cache 515 to ensure that all of the retrieved data is stored in both caches.

The invention claimed is:

1. A method implemented in a server, said server configured to support a computer implemented game playable on respective user devices in communication with said server, said method comprising:
receiving a request from one of said user devices for one or more records which provide information to said computer implemented game played on the user device;
retrieving any of said one or more records associated with said computer implemented game from a first data store storing a first subset of data if said one or more records is in said first subset of data;
retrieving any of said one or more records associated with said computer implemented game from a second data store storing a second subset of data if said one or more records is in said second subset of data and has not been retrieved from said first data store; and
retrieving any of said one or more records associated with said computer implemented game from a third data store storing said data if said one or more records are not in said first and second subsets of data,
wherein each of said records associated with said computer implemented game of said first subset of data are deleted from said first data store upon expiry of a first set time period since said each record of said first subset of data were stored in said first data store,
wherein each of said records of said second subset of data are deleted from said second data store upon expiry of a second set time period since said each record of said second subset of data were stored in said second data store,
wherein the first time period and the second time period are of different lengths,
wherein the first time period is correlated to at least one of:
a play length of the computer game; and
frequency of user interaction with said computer implemented game.

2. The method of claim 1 wherein said first subset is a subset of said second sub set.

3. The method of claim 1 wherein at least one of the first, second and third data stores comprises a plurality of data stores.

4. A method according claim 3 further comprising determining, from said request, in which of said plurality of data stores said one or more records is stored.

5. A method according to claim 1 further comprising storing the one or more records in the first data store and the second store if the one or more records are not already stored in the first data store and the second data store respectively.

6. A method according to claim 1 wherein said retrieving from said first data store is performed before said retrieving from said second data store and wherein said retrieving from said second data store is performed before said retrieving from said third data store.

7. A method according to claim 5 wherein the first set time period is determined by the first data store for each record in the first data store.

8. A method according to claim 7 wherein the second set time period is determined by the second data store for each record in the second data store.

9. A method according to claim 8 wherein said second time period is greater than said first time period.

10. A server comprising one or more processors in communication with one or more memories, said one or more processors being configured to execute instructions to enable the server to:

communicate with:
a first data store;
a second data store; and
a third data store;
receive a request for one or more records;
retrieve any of said one or more records from a first data store storing a first subset of data if said one or more records is in said first subset of data;
retrieve any of said one or more records from a second data store storing a second subset of data if said one or more records is in said second subset of data and has not been retrieved from said first data store; and
retrieve any of said one of more records from a third data store storing said data if said one or more records are not in said first and second subsets of data,
wherein each of said records of said first subset of data are deleted from said first data store upon expiry of a first set time period since said each record of said first subset of data were stored in said first data store,
wherein each of said records of said second subset of data are deleted from said second data store upon expiry of a second set time period since said each record of said second subset of data were stored in said second data store,
wherein the first time period and the second time period are of different lengths,
wherein the first time period is correlated to at least one of:

a play length of the computer game; and
frequency of user interaction with the computer-implemented game.

11. A server according to claim 10, wherein said first subset is a subset is a subset of said second subset.

12. A server according to claim 10, wherein at least one of the first, second or third data stores comprise a plurality of data stores.

13. A server according to claim 12, wherein at least one of the first or second data stores is configured to determine from said request, in which of said plurality of data stores said one or more records is stored.

14. A server according to claim 10, wherein said one or more processors are further configured to execute instructions to enable the server to store the one or more records in the first data store and the second store if the one or more records are not already stored in the first data store and the second data store respectively.

15. A server according to claim 10, wherein said retrieving from said first data store is performed before said retrieving from said second data store and wherein said retrieving from said second data store is performed before said retrieving from said third data store.

16. A server according to claim 10 in combination with said first data store, wherein said first set time period is determined by the first data store for each record in the first data store.

17. A server according to claim 16 in combination with the second data store, wherein said second set time period is determined by the second data store for each record in the second data store.

18. A server according to claim 17, wherein said second set time period is greater than said first set time period.

* * * * *